(12) United States Patent
Zuev et al.

(10) Patent No.: US 9,015,573 B2
(45) Date of Patent: Apr. 21, 2015

(54) OBJECT RECOGNITION AND DESCRIBING STRUCTURE OF GRAPHICAL OBJECTS

(75) Inventors: Konstantin Zuev, Moscow (RU); Diar Tuganbaev, Moscow (RU); Irina Filimonova, Moscow (RU)

(73) Assignee: ABBYY Development LLC (RU)

( * ) Notice: Subject to any disclaimer, the term of this patent is extended or adjusted under 35 U.S.C. 154(b) by 419 days.

(21) Appl. No.: 13/449,240

(22) Filed: Apr. 17, 2012

(65) Prior Publication Data

US 2012/0201420 A1   Aug. 9, 2012

Related U.S. Application Data

(63) Continuation-in-part of application No. 10/603,216, filed on Jun. 26, 2003, now Pat. No. 8,170,371, and a continuation-in-part of application No. 11/461,449, filed on Aug. 1, 2006, now abandoned, and a continuation-in-part of application No. 13/242,218, filed on Sep. 23, 2011.

(30) Foreign Application Priority Data

Mar. 28, 2003 (RU) .......................... 2003 1008434A
Jan. 25, 2006 (RU) .......................... 2006101908 A1

(51) Int. Cl.
*G06F 3/00* (2006.01)
*G06K 9/00* (2006.01)

(52) U.S. Cl.
CPC ........ *G06K 9/00456* (2013.01); *G06K 9/00463* (2013.01)

(58) Field of Classification Search
CPC ............ G06K 2209/01; G06K 9/6215; G06K 2209/0456; G06K 2209/00463; G06K 9/78; G06F 17/243

USPC .................... 715/234, 243, 254, 221; 706/48
See application file for complete search history.

(56) References Cited

U.S. PATENT DOCUMENTS

| | | |
|---|---|---|
| 5,025,484 A | 6/1991 | Yamanari et al. |
| 5,182,656 A | 1/1993 | Chevion et al. |
| 5,191,525 A | 3/1993 | LeBrun et al. |
| 5,235,654 A | 8/1993 | Anderson et al. |
| 5,257,328 A | 10/1993 | Shimizu |
| 5,317,646 A | 5/1994 | Sang et al. |
| 5,416,849 A | 5/1995 | Huang |
| 5,434,962 A | 7/1995 | Kyojima et al. |
| 5,748,809 A | 5/1998 | Hirsch |
| 5,793,887 A | 8/1998 | Zlotnick |

(Continued)

*Primary Examiner* — Kyle Stork
(74) *Attorney, Agent, or Firm* — LeighAnn Weiland; Veronica Weinstein (57) ABSTRACT

Methods for processing machine-readable forms or documents of non-fixed format are disclosed. The methods make use of, for example, a structural description of characteristics of document elements, a description of a logical structure of the document, and methods of searching for document elements by using the structural description. A structural description of the spatial and parametric characteristics of document elements and the logical connections between elements may include a hierarchical logical structure of the elements, specification of an algorithm of determining the search constraints, specification of characteristics of searched elements, and specification of a set of parameters for a compound element identified on the basis of the aggregate of its components. The method of describing the logical structure of a document and methods of searching for elements of a document may be based on the use of the structural description.

20 Claims, 2 Drawing Sheets

(56) References Cited

U.S. PATENT DOCUMENTS

| | | |
|---|---|---|
| 5,822,454 A | 10/1998 | Rangarajan |
| 6,400,845 B1 | 6/2002 | Volino |
| 6,640,009 B2 | 10/2003 | Zlotnick |
| 6,760,490 B1 | 7/2004 | Zlotnick |
| 6,778,703 B1 | 8/2004 | Zlotnick |
| 7,046,848 B1 | 5/2006 | Olcott |
| 7,149,347 B1 | 12/2006 | Wnek |
| 7,149,367 B2 | 12/2006 | Ross |
| 7,171,615 B2 | 1/2007 | Jensen et al. |
| 7,310,635 B2 | 12/2007 | Tucker |
| 7,346,215 B2 | 3/2008 | Shih et al. |
| 7,561,734 B1 | 7/2009 | Wnek |
| 7,764,830 B1 | 7/2010 | Wnek |
| 2002/0059265 A1 | 5/2002 | Valorose, III |
| 2002/0106128 A1 | 8/2002 | Zlotnick |
| 2004/0190790 A1* | 9/2004 | Zuev et al. ............... 382/291 |
| 2004/0223197 A1* | 11/2004 | Ohta et al. ............... 358/538 |
| 2004/0264774 A1* | 12/2004 | Anisimovich et al. ...... 382/173 |
| 2005/0163376 A1 | 7/2005 | Kaneda |
| 2006/0104511 A1 | 5/2006 | Guo et al. |
| 2006/0217956 A1 | 9/2006 | Nagao et al. |
| 2007/0076984 A1 | 4/2007 | Takahashi et al. |
| 2007/0168382 A1 | 7/2007 | Tillberg et al. |
| 2007/0172130 A1 | 7/2007 | Zuev |
| 2008/0025618 A1 | 1/2008 | Minagawa et al. |
| 2008/0195968 A1 | 8/2008 | Schacht |
| 2008/0205742 A1 | 8/2008 | Lund |
| 2009/0028437 A1 | 1/2009 | Hirohata |

* cited by examiner

OBJECT RECOGNITION AND DESCRIBING STRUCTURE OF GRAPHICAL OBJECTS

CROSS-REFERENCE TO RELATED APPLICATIONS

For purposes of the USPTO extra-statutory requirements, the present application constitutes a continuation-in-part of U.S. patent application Ser. No. 10/603,216 that was filed on 26 Jun. 2003, which is currently co-pending, or is an application of which a currently co-pending application is entitled to the benefit of the filing date. Application Ser. No. 10/603,216 in turn claims foreign priority to application 20031008434A filed in the Russian Federation on 28 Mar. 2003.

For purposes of the USPTO extra-statutory requirements, the present application also constitutes a continuation-in-part of U.S. patent application Ser. No. 11/461,449 that was filed on 1 Aug. 2006, which is currently co-pending, or is an application of which a currently co-pending application is entitled to the benefit of the filing date.

For purposes of the USPTO extra-statutory requirements, the present application also constitutes a continuation-in-part of U.S. patent application Ser. No. 13/242,218 that was filed on 23 Sep. 2012, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

The present invention relates generally to image recognition and particularly to the recognition of non-text and text objects contained in a bit-mapped image of a document.

BACKGROUND

Methods of structure assignment and document element search in electronic graphical images are known in the art (e.g., U.S. Pat. No. 5,416,849 issued to Huang on 16 May 1995). Typically, known methods to process fixed forms do not allow for deviations in field arrangement. Thus, when processing such documents as job candidate resumes, scanning software frequently errs in identifying fields such as previous experience, previous accomplishments, and current contact information. Even when the proper fields are located, there is a risk that the shape of certain fields is misidentified and leads to noise in performing recognition within fields and errors in object search while processing images of documents.

These and other shortcomings of the current art are overcome by use of the teachings described herein.

SUMMARY OF THE INVENTION

By using the techniques described herein, including the use of flexible structural descriptions, objects in an image may be searched and identified. Application of flexible structural descriptions includes a stage of forming block regions, i.e., calculation of searched field allocation on the basis of information about found or identified objects.

A structural description includes a description of spatial and parametric characteristics of document elements, logical connections between document elements and searching methods or algorithms of the elements or fields that can be found in the document or form.

The method of preliminary assignment of a document structure includes setting a description of the document's logical structure in the form of interrelation of spatial and parametric characteristics of elements. The method also includes using algorithms for obtaining parameters for searching for each element, using methods of identifying located elements, using methods of decreasing the number of obtained variants of an element, and using methods for accelerating searches for a best variant.

The method of searching and recognizing elements (fields or field fragments) of a document as part of a graphical (bit-mapped) image includes using a predefined logical structure of the document in the form of structural descriptions. The method also includes using algorithms of obtaining the parameters of the search for each element, using methods of identifying the obtained elements, using methods of decreasing the number of obtained variants of an element, and accelerating the search for a best variant.

Preliminary assignment involves a method of setting the logical structure of a document in the form of a structural description. Preliminary assignment may also include creating a structure of element locations, creating a structure of element connections, and specifying the structure in the form of arrangement and connections of simple and compound elements.

A list and a description of varieties (types) of elements that may be present in a document or form are preliminarily specified. An algorithm for specifying the search parameters for each element is described in a structural description. A set of at least spatial characteristics of a search area or parametric characteristics of the search for each simple or compound element is described in the structural description. A set of spatial and parametric characteristics sufficient for search for and identifying an element is used to describe elements of a document of a non-fixed format. A structural description includes a description of spatial and/or parametric characteristics of the element, and a description of its logical connections with other elements.

A flexible structural description may also include all or some of the following conditions. The logical structure of a document is represented as a sequence of elements connected mainly by hierarchical dependences, an algorithm of determining the search parameters is set, spatial characteristics for searching for each element are specified, parametric characteristics of the searching for each element are set, the set of parameters for identifying a compound element on the basis of the aggregate of components is set, and an algorithm of estimating the quality of an obtained variant of an element is set.

A flexible structural description may also include a separate brief structural description for determining the correct spatial orientation of the image.

A flexible structural description may also include a separate brief structural description for determining the document type and selecting the corresponding comprehensive document description from several possible descriptions. A comprehensive description is created for each document type. If a document type does not have a brief description, then the comprehensive description of the document is used for selecting its type.

The invention with regard to the method of searching (recognizing) elements (fields) on a document or form in a bit-mapped image according to a first method involves the following. A method of searching and identifying (including recognition of) the elements of a document with non-fixed format comprises at least the following preliminary actions: revision of the whole document image, detection of obtained objects or object fragments, initial classification of detected objects according to the set of predefined types, and recognition of all or a part of text objects where each object is recognized partially or entirely. To speed up processing, recognition of text objects may be performed to a degree that is sufficient for identifying the document structure and other elements of the form.

A method of search and recognition (identification) of elements (fields) on a document of non-fixed format according to a second variant comprises at least the following preliminary actions: revision of the entire document image, allocation of detected objects or object fragments, performing an initial classification of the allocated objects according to a set of predefined types, recognition of all or a part of text objects, where each object is recognized partially or entirely, and recognition of text objects is performed to a degree which is sufficient for identifying the document structure and other elements of the form.

Searching for elements with the help of a flexible structural description is performed sequentially in the order in which they are described in the flexible structural description, top-down through a "tree" (or some form of hierarchy) of elements, in accordance with the logical structure of the document description. For each element in the assigned search area, several variants of image objects or sets of image objects corresponding to the description of the element in the structural description may be found. Various obtained variants of objects are considered to be the variants of the position of the element on the image. An estimate of the degree of correspondence of the variant to the element description is assigned to each obtained variant (i.e., an estimate of the quality of the variant).

Accuracy of the obtained position of the object determines the accuracy of obtaining the positions of objects described further in the description relative to this object. Searching for the next dependent object is performed separately for each obtained variant of the current object. Therefore, the variants of objects obtained from the image comprise a hierarchical tree considerably more branched than a hierarchical tree of elements in a structural description.

If an element or an object is compound, i.e., composed of several parts or simple elements, the whole group also represents an element, which requires generating several possible variants, the number of which corresponds to the number of complete chains of group sub-elements (dependent elements of a lower level). The chain is considered complete if all its obtained sub-elements (elements of a lower level) have sufficient quality. A total estimate of the quality of a variant of a compound element is calculated by multiplying the estimates of the quality of element variants forming the compound element. A flexible structural description as a whole also represents a compound element. Therefore, the quality of the correspondence of the variant to the flexible structural description is determined, for example, by multiplying the quality factors of its elements.

Application of a flexible structural description comprises searching for the best complete branch in the whole tree of variants, i.e., a branch that include all the elements, from first to last. A general solution of such a task implies taking into consideration all the possible combinations of hypotheses for all elements, construction of a total multitude of complete branches and selecting the best among them. However, in practice, such a solution often requires excessive calculating or computational resources of a device, and is therefore impractical. Moreover, an abrupt increase in the number of variants taken into consideration is possible, caused by an increase in the number of elements and a lack of rigid restrictions on the search area and element parameters.

To limit the time and resources required to analyze variants, one of several methods of decreasing the volume is used. For example, each element gets a maximum allowed number of acceptable variants, rated in quality in decreasing order. These variants can be used in a further search, i.e., when searching for a next element. Any variants beyond this number are discarded. Commonly, this number is set to, for example, five for simple elements and one for compound elements. This means that, if 15 variants are obtained for a simple element in the assigned search area, five variants with the best quality rating are selected. The other 10 chains of variants will not be complete and are not taken into consideration. A compound element is identified with a greater quality rating than a simple element, because the quality of identification is determined not only by multiplying the quality ratings of the constituent simple elements, but also by several additional (mainly qualitative) characteristics, such as mutual arrangement, object size, correspondence to the conditions of mutual arrangement several elements, and so on.

Since a compound element is identified with a greater quality rating than a simple element, its best variant usually turns out to be accurate.

The process of searching for objects almost always includes generating several incomplete chains of variants of obtained objects and, therefore, yields several directions for further search. Search for a best hypothesis is performed by using an algorithm for "broad searching," i.e., the search is directed through the chain of variants which has the best quality rating at the current step regardless of the length of the chain. For example, if in a flexible structural description of 30 elements where 2 chains are obtained during a search, one of which consists of 30 elements with a total quality rating of 0.89 and the other chain has 2 elements with a total quality rating of 0.92, then the second chain will be pursued until its total quality becomes lower than that of the first chain.

The following rule of quality optimization is used for compound elements: if an ideal complete chain for this element is obtained, i.e., the quality of the obtained chain equals 1, other variants of sub-elements composition of this compound element are not taken into consideration.

Moreover, a maximum number of variants for every element in the entire hypothesis tree is restricted to 1000 or some reasonable limit depending on a desired level of performance of the method.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

DETAILED DESCRIPTION OF THE INVENTION

Methods are disclosed herein for recognition of data input forms that may include typographical and handwritten texts and special text-marks for document navigation. Documents and forms as used herein include inquiry lists, questionnaires, and bank documents with rigid or arbitrary arrangement of data fields. The described methods also may be applied to recognition of predefined form objects contained in an electronic graphical image.

Methods of preliminary assigning a document structure to a document include setting a logical structure of a document in the form of a structural description. The structural description includes creating a structure of element locations, creating a structure of element connections, and specifying a structure in the form of arrangement and connections of simple and compound elements.

The methods also include forming a list and a description of varieties (types) of elements that may be present in the form or document. An algorithm for specifying search parameters for each element may be described in the structural description. A set of at least spatial characteristics of one or more search areas and a set of parametric characteristics of a search for each simple and/or compound element may be described in the structural description.

A method of identifying the obtained elements, testing the element type, testing the properties typical of the present type, and testing the completeness of the composition of the element is described.

Testing the completeness of the composition of an element comprises estimating values related to the absolute spatial characteristics of the element, estimating values of the relative spatial characteristics of the element, estimating values of parametric characteristics of the element, and generating one or more rules for assigning quality values to obtained elements and/or parts thereof.

A method or several methods of decreasing the number of analyzed variants of composition of a compound element and accelerating the search for the best variant are described.

Values of spatial and parametric characteristics may be represented as exact, interval values, or a combination of such. One or several earlier obtained objects, or any one or several obtained lines, or one or several points, or one or several borders of a document may be assigned as a starting point for calculating relative spatial characteristics.

The structure of element connection is mainly realized as a hierarchical structure.

A method of decreasing the number of variants of composition of a compound element comprises the following actions. A limited number of assigned variants with a best quality rating or value are kept for further consideration. Other variants are discarded. A search for a best variant of a compound element is performed by taking into account a best total quality rating or value of the analyzed components, regardless of their number. For example, a total quality rating or value of the compound element is calculated as a product of the quality ratings of the simple and/or compound elements composing it.

The invention with regard to a method of searching and optionally recognizing elements (e.g., fields) on a document or form in a bit-mapped image according to a first method includes the following. First, the elements of a document with non-fixed format are searched and identified (and optionally recognized).

The following preliminary actions may be performed. A revision of the whole document image may be done. Obtained objects or object fragments are detected. An initial classification of detected objects is done according to a set of predefined types. Recognition of all or a part of text objects is done where each object is recognized partially or entirely. To speed up the processing, recognition of text objects is performed to a degree that is sufficient for identifying the document structure and other elements of the form.

A separate structural description is set to detect the spatial orientation of an object. Such a description usually contains a brief set of structural elements that can be easily recognized on a document (form). Orientation is accepted as correct when the elements of the structural description coincide with the elements on the image with the best quality estimate or rating.

A corresponding separate brief description is set for quick detection of the type of recognized document which allows for selecting a comprehensive (main) description of the document type from several preliminarily specified descriptions. A comprehensive description is created for each document type. If any document type does not have a brief description, then the comprehensive description of the document is used for selecting its type, and the selection of the document type is performed by comparing quality estimates of the used (brief or comprehensive) descriptions of different types.

Then the following actions are performed: choosing an element for search in the structural description, obtaining an algorithm for determining the search parameters from the structural description, searching for the element, and testing found variants.

Searching for an element includes searching by using the spatial characteristics of the search area. For example, a spatial characteristic can be a half-plane, a rectangle, a circle, a polygon, or any combinations thereof. Searching for an element also includes searching by using parametric characteristics or spatial characteristics of an element. For example, elements may be found by absolute coordinates or coordinates relative to other elements (e.g., located higher in the tree), or by a combination of absolute and relative coordinates. The coordinates may be specified as exact values or as intervals.

Searching may be done with the help of the preliminary text recognition results.

Testing of detected elements comprises: identifying detected elements, analyzing the results of testing of hypotheses about the presence of the element, evaluating completeness of the element composition and types of composite parts of the element, and analyzing correspondence of the structure of a compound element to the hypothesis.

Optimization of the search through element combination variants further comprises assigning to each element several variants with the best quality rating (estimate). The ones with the best ratings or estimates are kept for further analysis, and other variants are discarded. Optimization of the search through element combination variants further comprises searching for the best variant of a compound element taking into account the best total quality estimate of the composite parts regardless of their number. A total quality estimate of a compound element is calculated, for example, as the product of the quality estimates of the parts thereof. Additionally, other available qualitative characteristics may be taken into consideration. Initially, the first element in the list is selected.

The following spatial characteristics of an element may be also applied: absolute coordinates and coordinates with regard to other elements. The coordinates may be specified as exact values or as one or more intervals. The following exemplary spatial characteristics of the search area may be used: half-plane, rectangle, circle, and polygon. Other spatial characteristics may be used.

Revision of the element combination variants is considered complete when the total quality estimate of the complete set of elements achieves a quality value of about, approximately, or identically equal to 1.

The number of variants of a compound element that have the best quality estimate and are used for further analysis should be in the range from about one to about three.

The number of variants of a simple element that have the best quality estimate and are used for further analysis should be in the range from about three to about ten.

A method of search and recognition (identification) of elements (fields) on a document of non-fixed format according to a second variation comprises at least the following preliminary actions: revision of the entire document image, allocation of the detected objects or object fragments, performing an initial classification of the allocated objects according to a set of predefined types, recognition of all or a part of text objects where each object is recognized partially or entirely, and recognition of text objects performed to a degree which is sufficient for identifying the document structure and other elements of the form.

A separate brief structural description optionally may be set to detect the spatial orientation of an object. Such a description usually contains a brief set of structural elements which can be easily recognized on a document (form). Orientation is accepted as correct if the elements of the structural description coincide with the elements on the image with the best quality estimate.

A corresponding separate brief description optionally may be set for quick detection of the type of a recognized document and selecting the comprehensive (main) description of the document type from several preliminarily specified descriptions. A comprehensive description is created for each document type. If any document type does not have a brief description, then the comprehensive description of the document is used for selecting its type, and the selection of the document type is performed by comparing the quality estimates of the used (brief or comprehensive) descriptions of different types.

Then all or at least a part of the following operations are performed:

choosing the next element in the structural description (such as starting from a first one); and calculating or obtaining from the structural description a predefined algorithm for determining the search parameters.

Performing a search for an element, comprising at least the following operations: (1) searching by using the spatial characteristics of the search area such as, for example, half-plane, rectangle, circle, polygon and others; (2) searching by using the parametric characteristics of an element (the type of element); and (3) searching by using the spatial characteristics of an element, the spatial characteristics being represented by, for example, absolute coordinates and/or coordinates relative to the other elements. Coordinates may be specified as exact values or as one or more intervals.

Calculating the quality of correspondence of the found variant to the description of the required element.

Testing the obtained variant of the object, wherein testing comprises the following operations: (1) identifying the obtained element variant; (2) calculating the quality of the identification of the element; (3) analyzing the results of testing the hypotheses about the presence and completeness of the composition of the compound element and the types of composite parts, analyzing of the correspondence of a compound element to the hypothesis about the type of the element; and (4) calculating the total quality of the obtained variant.

Optimization of revision of element combination variants, wherein optimization comprises: (1) assigning to each type of the element several variants with the best quality rating, wherein the variants with the best quality ratings are kept or stored for further analysis; (2) searching for the best variant of a compound element, taking into account the best total quality estimate of composite parts, regardless of their number; and (3) revision of the quality estimates of the variants which were discarded earlier in order to find any quality estimates higher than the current one. If the total quality estimate is lower than a predefined level, optimization includes searching for a next variant of the same element and calculating its total quality estimate. If the total quality estimate is higher than the predefined level, optimization includes searching for the next element. The variant with the maximum total quality estimate is selected.

Searching for the best variant of a compound element is performed, taking into account a best total quality estimate of corresponding composite parts, regardless of their number. Quality of a variant as used herein is an estimation that indicates a degree of correspondence of the obtained variant to the present element (e.g., its properties and search constraints). In one example, the numerical constituent of the quality of a variant is a number ranging from about or exactly 0 to about or exactly 1. The quality of a hypothesis for a compound element, for example, is calculated by multiplying the quality estimates of the hypotheses of all the sub-elements thereof. Other methods may be used to calculate or determine a quality value for a compound element.

The quality of a variant is a result of multiplication of the quality of the element, assigned at the stage of specification of the structural description during the specification of the element type, and the quality of the element (field, object), calculated at the stage of the search. The total quality of the variant is calculated, for example, as a product of quality ratings of all interdependent composing elements in the chain, from the first element in the structural description to the current element.

For optional elements (i.e., elements that may be missing or not taking into consideration on a document), a "zero" variant of an element is used, if the element has not been detected. A zero variant supposes that the sought object is missing in the search area. A zero variant is formed, if no object is detected corresponding to the optional element or the non-zero variant quality estimate is lower than the quality of the zero variant. If the zero variant is selected as the most appropriate, the searching and identifying of the next element in the list in the structural description (including the elements which depend on the not obtained or missing element) is undertaken. Alternatively, this may be done by analyzing one of the previously rejected variants of the same or another element, simultaneously taking appropriate steps to avoid obtaining an infinite loop in the process. If no objects are detected corresponding to the optional element, the use of the flexible description is proceeded (not stopped). Instead of the sought object, a zero variant is generated. The zero variant gains the quality value of the optional element predefined by the user in the description.

Searching for elements with the help of a flexible structural description is performed sequentially in the order in which they are described in the flexible structural description, top-down through the "tree" or other form of hierarchy of elements, in accordance with the logical structure of the document description. For each element in the assigned search area, several variants of image objects or sets of image objects corresponding to the description of the element in the structural description may be found. Various obtained variants of objects are considered to be the variants of the position of the element on the image. An estimate of the degree of correspondence of the variant to the element description is assigned to each obtained variant, i.e., the estimate of the quality of the variant.

The accuracy of the obtained position of the object determines the accuracy of obtaining the positions of objects described further in the description relative to this object. Searching for the next dependent object is performed separately for each obtained variant of the current object. Therefore, the variants of objects obtained on the image comprise a hierarchical tree, considerably more branched than the hierarchical tree of elements in a structural description.

If an element or an object is compound, i.e. composed of several parts (simple elements), the whole group also represents an element, which requires generating several possible variants, the number of which corresponds to the number of complete chains of group sub-elements (dependent elements of a lower level). The chain is considered complete if all its obtained sub-elements (elements of a lower level) have sufficient quality. The total estimate of the quality of a variant of a compound element, for example, is calculated by multiplying the estimates of the quality of element variants forming the compound element. A flexible structural description as a whole also represents a compound element, therefore, the quality of the correspondence of the variant to the flexible structural description is determined, for example, by multiplying the quality factors of its elements.

Application of a flexible structural description comprises searching for the best complete branch in the whole tree of variants, i.e., the branch that include all the elements, from first to last. A general solution of such a task implies taking into consideration all the possible combinations of hypotheses for all elements, construction of a total multitude of complete branches and selecting the best among them. However, in some cases, such a solution requires too many calculating resources (e.g., clock cycles, random-access memory), and is therefore impractical. Moreover, an abrupt increase in the number of variants taken into consideration is possible, caused by an increase in the number of elements and a lack of rigid restrictions on the search area and element parameters.

To limit the time and resources required to analyze the variants, one of several methods of decreasing the volume may be used. For example, each element gets the maximum allowed number of acceptable variants, rated in quality in a decreasing order. These variants may be used in further searching, i.e., when searching for a next element. Any variants beyond this number are discarded. Commonly this number is taken equal to about five for simple elements and about one for compound elements. This means that, if 15 variants are obtained for a simple element in the assigned search area, five variants with the best quality rating will be selected. The other 10 chains of variants are not completed and are not taken into consideration. A compound element is identified with a greater quality rating than a simple element, because the quality of identification is determined not only, for example, by multiplying the quality ratings of the constituent simple elements, but also by several additional (mainly qualitative) characteristics, such as mutual arrangement, object size, correspondence to the conditions of mutual arrangement several elements, and so on.

Since a compound element is identified with a greater quality rating than a simple element, its best variant usually turns out to be accurate.

The process of searching for objects may include generating several incomplete chains of variants of obtained objects and, therefore, several directions of further search. Search for the best hypothesis is performed by using an algorithm for "broad searching," i.e., the search is directed through the chain of variants which has the best quality rating at the current step, regardless of the length of the chain. For example, if in a flexible structural description of 30 elements and 2 chains are obtained during the search, one of which consists of 30 elements with the total quality rating of 0.89 and the other chain has 2 elements with the total quality rating of 0.92, then the second chain will be pursued until its total quality becomes lower than that of the first chain.

The following rule of quality optimization is used for compound elements: if an ideal complete chain for this element is obtained, i.e., the quality of the obtained chain equals one (or sufficiently nearly one), other variants of sub-elements composition of this compound element are not taken into consideration.

Moreover, a maximum number of variants for every element in the entire hypothesis tree is restricted to 1,000 or some other reasonable or desired limit depending on resources of a computing processor, bandwidth availability, etc.

For flexible structural description creation, the following main types of elements are used conventionally and are divided into, for example, simple elements and compound elements.

A simple element is an element that does not contain other elements such as and without limitation, a static text, a separator, a white field, a barcode, a text string, a text fragment, a set of objects, a date, a telephone number, a currency, and a table.

A compound element is a group of elements or some other type or designation of a complex element or aggregation or collection of elements. A compound element may be an aggregate of several elements or sub-elements. Sub-elements may be simple or compound.

Static text, as supposed herein, may be an element of structural description describing a text with a known meaning. A text may consist of one word, several words, or an entire paragraph. Several words may be distinguished from a single word by the presence of at least one blank space or another inter-word separator, depending on the language, for example, a full stop, a comma, a colon, or any other punctuation mark. Several words may take up several text strings.

A separator, as supposed herein, is an element representing a vertical or horizontal graphical object between other objects. A separator can be represented, for example, by a solid line or a dotted line.

A white field, as supposed herein, is an element of description representing a rectangular or other shape or region of an image which does not contain any objects within it.

A barcode, as supposed herein, is an element of flexible description representing a drawing, such as a line drawing, that encodes numerical or other information.

A text string, as supposed herein, is an element representing a sequence of characters located on a single line one after another. Character strings can consist of text objects, for example, words, or of fragments of text objects.

A text fragment, as supposed herein, is an element representing an aggregate of text objects.

A set of objects (a designated or specified type), as supposed herein, is an element representing an aggregate of different types of objects on an image, where each object meets one or more search constraints.

A date as supposed herein, is an element representing a date, time or combination of date and time.

A telephone number, as supposed herein, is an element representing a telephone number, and may be accompanied by a text-based prefix ("tel.", "home tel.", etc.) and by a numeric code such as a city/region, which is separated from the number by brackets or other delimiter.

A currency, as supposed herein, is an element of description representing money sums, where the name of the currency can be used as a prefix, label, etc.

A table, as supposed herein, is an element of flexible description representing data in the form of a table.

A compound element may be used for a variety of purposes. For example, they may be used for joining elements into a group. Each of these compound elements may contain smaller compound elements meant for smaller fragments of the element search. Compound elements can provide a logical hierarchy of elements for better navigation through the structural description. Compound elements also can reduce the number of possible variants of the element in order to speed up a search for the resulting variant. Joining elements into a compound element allows analysis of a set of sub-elements as a single entity which can have its own complete variant (consisting of the variants of the sub-elements) and a total estimate of reliability of the entire group. Revision of possible combinations of variants of the sub-elements may be performed within a group, and only a predefined number of the best variants in the group take part in the further analysis and search for subsequent elements. The number of the best variants of a compound element that take part in further searching is usually 1. Restrictions may be made for a search area. The restrictions may be common for all sub-elements. In one example, the search area of a certain sub-element is calculated as the intersection of the search area set for the sub-element itself and the search area of the group which contains this sub-element.

Figure 1:
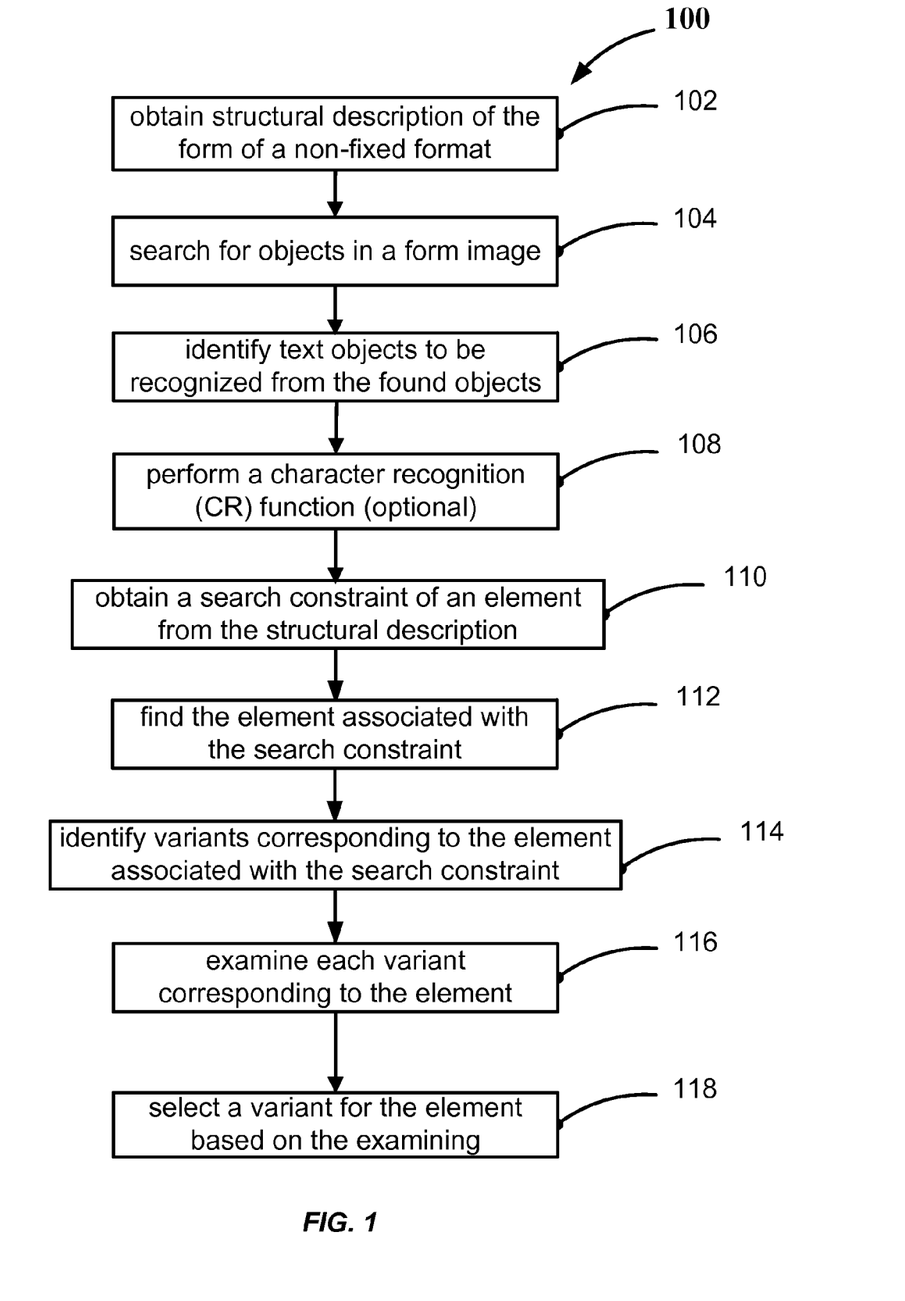
FIG. 1 shows an exemplary implementation or embodiment of a method for determining structure in a form or document.

FIG. 1 illustrates an exemplary implementation or embodiment of a method 100 for determining structure in a form or document. With reference to FIG. 1, a structural description of the form of a non-fixed format is obtained 102. Next, a search is performed to locate objects in the form image 104. Text objects are identified 106, objects that are to be or could be recognized. These text objects are generally among those located as part of the search for objects 104. Optionally, a character recognition (CR) function is perfomed 108. The CR function may be a full or partial recognition, or may be a pre-recognition function that may be associated with a CR function. Next, a search constraint of an element from the structural description is obtained 110. The method 100 next includes finding the element associated with the search constraint 112. Next, variants corresponding to the element associated with the search constraint are identified 114. The variants are examined 116, and a variant for the element is selected or identified 118.

Figure 2:
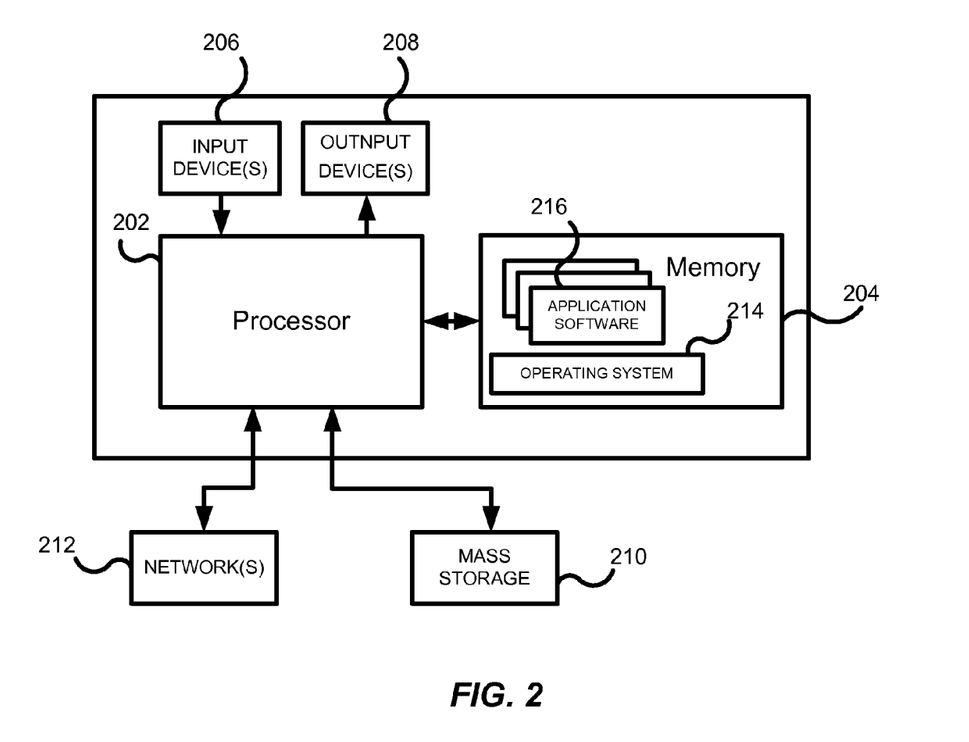
FIG. 2 shows an exemplary hardware for implementing computer system in accordance with one embodiment of the invention.

Referring to FIG. 2, an example of hardware 200 that may be used to implement the techniques disclosed herein is shown, in accordance with an embodiment of the present disclosure. The hardware 200 typically includes at least one processor 202 coupled to a memory 204. The processor 202 may represent one or more processors (e.g., microprocessors), and the memory 204 may represent random access memory (RAM) devices comprising a main storage of the hardware 200, as well as any supplemental levels of memory e.g., cache memories, non-volatile or back-up memories (e.g. programmable or flash memories), read-only memories, etc. In addition, the memory 204 may be considered to include memory storage physically located elsewhere in the hardware 200, e.g. any cache memory in the processor 202, as well as any storage capacity used as a virtual memory, e.g., as stored on a mass storage device 210.

The hardware 200 also typically receives a number of inputs and outputs for communicating information externally. For interface with a user or operator, the hardware 200 may include one or more user input devices 206 (e.g., a keyboard, a mouse, a scanner etc.) and a display 208 (e.g., a Liquid Crystal Display (LCD) panel). For additional storage, the hardware 200 may also include one or more mass storage devices 210, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 200 may include an interface with one or more networks 212 (e.g., a local area network (LAN), a wide area network (WAN), a wireless network, and/or the Internet among others) to permit the communication of information with other computers coupled to the networks. It should be appreciated that the hardware 200 typically includes suitable analog and/or digital interfaces between the processor 202 and each of the components 204, 206, 208 and 212 as is well known in the art.

The hardware 200 operates under the control of an operating system 214, and executes various computer software applications, components, programs, objects, modules, etc. indicated collectively by reference numeral 216 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

We claim:

1. A method for searching for elements of a form of a non-fixed format, the method comprising:
    obtaining a structural description of the form of a non-fixed format, wherein the structural description includes a description of spatial and parametric characteristics of elements of the form;
    searching for objects in a form image corresponding to those of the form;
    identifying text objects to be recognized from the found objects in the form image;
    performing a character recognition (CR) function via a computer processor on each of said text objects;
    obtaining a search constraint of an element from the structural description;
    finding the element associated with the search constraint in the form image based on found objects;
    identifying variants corresponding to the element associated with the search constraint;
    examining each of the variants corresponding to the element; and
    selecting a variant for the element.

2. The method as recited in claim 1, wherein searching for elements of the form image is based on items including:
    spatial characteristics of a search area for the element;
    a parametric characteristic of the element;
    a spatial characteristic of the element represented as an exact value or as an interval of values; and
    a result of preliminary text recognition.

3. The method as recited in claim 1, wherein said examining each of the variants corresponding to the element comprises:
    estimating a quality of identification related to an identity of the element;
    identifying hypotheses corresponding to the element;
    analyzing results of testing the hypotheses about a presence, completeness of composition of an element that is a compound element, or types of parts of an element that is a compound element including analyzing types of parts corresponding to a hypothesis about a type of the compound element; and
    estimating a total reliability of each variant of the plurality of variants.

4. The method as recited in claim 1, wherein the method further comprises:
    after selecting the variant for the element, optimizing the selected variant based on a revision of compound element combinations when the element is a compound element.

5. The method as recited in claim 4, wherein said optimizing the selected variant comprises:
    identifying a number of variants that satisfy a quality rating and discarding variants that do not satisfy a quality rating; and
    searching for a preferred variant of the compound element based on a preferred total quality rating based on ratings of accountable composite parts, regardless of their number.

6. The method as recited in claim 1, wherein the method further comprises:
    determining an orientation of the form image.

7. The method as recited in claim 6, wherein all or a portion of elements of the structural description are used to determine a desired image orientation for the form image, and wherein the search constraint is based on a result of said performed CR function.

8. The method as recited in claim 6, wherein an auxiliary brief description is specified to determine the orientation of the form image.

9. The method as recited in claim 1, wherein the type of a document corresponding to the form is selected from several preliminarily specified document types based on a structural description of the form in reference to a type of element found in the form.

10. The method as recited in claim 9, wherein a supplementary brief structural description is assigned for determining a document type for the form and for selecting a comprehensive document description from the several preliminarily specified types.

11. The method as recited in claim 1, wherein the spatial characteristics of an element comprise at least a set of absolute coordinates or relative coordinates.

12. The method as recited in claim 1, wherein exact, interval characteristics or exact and interval characteristics of a search element are identified.

13. The method as recited in claim 5, wherein searching for a next element is performed when no variant for the current element is selected or the total quality rating is lower than a predefined value.

14. The method as recited in claim 1, wherein when no object is found in a specified region of the image, searching for an object corresponding to a next element of the structural description.

15. One or more non-transitory computer readable media encoded with instructions for causing one or more processors to perform a method for searching for an element of a form of non-fixed layout using a structural description, the instructions causing acts comprising:
    obtaining a structural description of the form of a non-fixed format, wherein the structural description includes a description of spatial characteristics of elements of the form;
    searching for objects in a form image corresponding to those of the form of a non-fixed format;
    identifying text objects to be recognized;
    performing a character recognition (CR) function via said one or more processors on each of said text objects;
    obtaining a search constraint of an element from the structural description;
    finding the element in the form image based on found objects;
    identifying variants corresponding to the element;

examining each of the variants corresponding to the element; and selecting a variant for the element.

16. The one or more non-transitory computer readable media of claim 15, wherein the search constraint is based on a result of said CR function.

17. The one or more non-transitory computer readable media of claim 15, wherein the type of a document corresponding to the form is selected from several preliminarily specified document types based on a structural description of the form in reference to a type of element likely to be found in the form.

18. The one or more non-transitory computer readable media of claim 17, wherein a supplementary brief structural description is assigned, prior to obtaining a structural description of the form of a non-fixed format, for determining a document type for the form.

19. A device for searching for elements of a form of a non-fixed format, the device comprising:

a processor;

a memory in electronic communication with the processor, wherein the memory is configured with instructions to cause the processor to perform actions comprising:

obtaining a structural description of the form of a non-fixed format, wherein the structural description includes a description of spatial and parametric characteristics of elements of the form;

searching for objects in a form image corresponding to those of the form of a non-fixed format;

identifying text objects to be recognized;

performing a character recognition (CR) function via a computer processor on each of said text objects;

obtaining a search constraint of an element from the structural description;

finding the element in the form image based on one or more found objects;

identifying variants corresponding to the element;

examining each of the variants corresponding to the element, wherein examining includes estimating a value related to quality of identification of the element; and selecting a variant for the element based on said examining each of the variants.

20. The device of claim 19, wherein examining of each of the variants further includes:

reducing a number of identified variants by providing a quality rating to each of the identified variants;

where a variant is a compound variant, combining quality ratings of components of said compound variant to obtain a total quality rating for said compound variant; and reducing the number of identified variants by taking a preferred number of variants based on respective quality ratings.

* * * * *